(12) United States Patent
Wang et al.

(10) Patent No.: US 10,843,442 B2
(45) Date of Patent: Nov. 24, 2020

(54) COATED MEMBRANE COMPOSITE

(71) Applicant: Firestone Building Products Company, LLC, Nashville, TN (US)

(72) Inventors: Hao Wang, Carmel, IN (US); Michael J. Hubbard, Murfreesboro, TN (US); Brian Alexander, Westfield, IN (US)

(73) Assignee: Firestone Building Products Company, LLC, Nashville, TN (US)

( * ) Notice: Subject to any disclaimer, the term of this patent is extended or adjusted under 35 U.S.C. 154(b) by 0 days.

(21) Appl. No.: 16/309,125

(22) PCT Filed: Jun. 19, 2017

(86) PCT No.: PCT/US2017/038153
§ 371 (c)(1),
(2) Date: Dec. 12, 2018

(87) PCT Pub. No.: WO2017/219026
PCT Pub. Date: Dec. 21, 2017

(65) Prior Publication Data
US 2019/0308395 A1    Oct. 10, 2019

Related U.S. Application Data

(60) Provisional application No. 62/351,355, filed on Jun. 17, 2016.

(51) Int. Cl.
*B32B 25/16* (2006.01)
*B32B 27/28* (2006.01)
(Continued)

(52) U.S. Cl.
CPC ............ *B32B 25/16* (2013.01); *B29C 65/483* (2013.01); *B29C 65/5057* (2013.01); *B29C 66/1122* (2013.01); *B29C 66/43* (2013.01); *B29C 66/71* (2013.01); *B29C 66/723* (2013.01); *B32B 5/18* (2013.01); *B32B 5/245* (2013.01); *B32B 7/12* (2013.01); *B32B 13/042* (2013.01); *B32B 13/12* (2013.01); *B32B 15/04* (2013.01); *B32B 15/046* (2013.01); *B32B 15/06* (2013.01); *B32B 15/08* (2013.01); *B32B 15/09* (2013.01);
(Continued)

(58) Field of Classification Search
CPC .................................................. B32B 2419/06
See application file for complete search history.

(56) References Cited

U.S. PATENT DOCUMENTS

| | | | |
|---|---|---|---|
| 4,500,584 | A | 2/1985 | Modic |
| 4,668,315 | A | 5/1987 | Brady |

(Continued)

FOREIGN PATENT DOCUMENTS

| | | | |
|---|---|---|---|
| EP | 1088540 | A1 | 4/2001 |
| EP | 2130883 | A2 | 12/2009 |
| WO | 9954420 | A1 | 10/1999 |

OTHER PUBLICATIONS

"Royaltherm High Performance Elastomer Product Data" (Year: NA).*
International Search Report and Written Opinion dated Sep. 13, 2017 for corresponding PCT/US2017/038153.

*Primary Examiner* — Ian A Rummel

(57) ABSTRACT

A membrane composite comprising an olefinic membrane core having first and second planar surfaces, a first silicone coating layer disposed on the first planar surface, and a second silicone coating layer disposed on the second planar surface.

18 Claims, 2 Drawing Sheets

(51) Int. Cl.
| | |
|---|---|
| B32B 7/12 | (2006.01) |
| E04D 5/10 | (2006.01) |
| B29C 65/00 | (2006.01) |
| B32B 15/09 | (2006.01) |
| B32B 25/04 | (2006.01) |
| B32B 21/04 | (2006.01) |
| B32B 13/04 | (2006.01) |
| B32B 15/06 | (2006.01) |
| B32B 27/06 | (2006.01) |
| B32B 15/08 | (2006.01) |
| B32B 5/18 | (2006.01) |
| B29C 65/50 | (2006.01) |
| C09D 183/04 | (2006.01) |
| B32B 15/04 | (2006.01) |
| C08J 7/04 | (2020.01) |
| B32B 27/32 | (2006.01) |
| B32B 5/24 | (2006.01) |
| B29C 65/48 | (2006.01) |
| B32B 29/00 | (2006.01) |
| B32B 13/12 | (2006.01) |
| B32B 25/14 | (2006.01) |
| B32B 21/08 | (2006.01) |
| E04D 5/14 | (2006.01) |
| B29L 31/10 | (2006.01) |

(52) U.S. Cl.
CPC ............ *B32B 21/04* (2013.01); *B32B 21/045* (2013.01); *B32B 21/047* (2013.01); *B32B 21/08* (2013.01); *B32B 25/045* (2013.01); *B32B 25/14* (2013.01); *B32B 27/065* (2013.01); *B32B 27/283* (2013.01); *B32B 27/32* (2013.01); *B32B 29/007* (2013.01); *C08J 7/042* (2013.01); *C09D 183/04* (2013.01); *E04D 5/10* (2013.01); *B29L 2031/108* (2013.01); *B32B 2255/10* (2013.01); *B32B 2255/102* (2013.01); *B32B 2255/26* (2013.01); *B32B 2266/0214* (2013.01); *B32B 2266/0278* (2013.01); *B32B 2305/72* (2013.01); *B32B 2307/304* (2013.01); *B32B 2307/3065* (2013.01); *B32B 2307/546* (2013.01); *B32B 2307/732* (2013.01); *B32B 2419/06* (2013.01); *C08J 2323/16* (2013.01); *C08J 2483/04* (2013.01); *E04D 5/148* (2013.01)

(56) References Cited

U.S. PATENT DOCUMENTS

| | | | |
|---|---|---|---|
| 4,681,808 | A | 7/1987 | Leffler, III |
| 4,929,703 | A | 5/1990 | Narula |
| 4,942,065 | A | 7/1990 | Factor |
| 6,805,914 | B2 | 10/2004 | Clark |
| 7,994,261 | B2 | 8/2011 | Beers |
| 8,304,505 | B2 | 11/2012 | Sixt |
| 8,747,607 | B2 | 6/2014 | Huck |
| 2009/0022999 | A1 | 1/2009 | Wuu |
| 2009/0156755 | A1 | 6/2009 | Herzig |
| 2009/0169813 | A1 | 7/2009 | West |
| 2009/0246539 | A1 | 10/2009 | Huck |
| 2010/0330352 | A1 | 12/2010 | Yuding |
| 2011/0015336 | A1 | 1/2011 | Koellnberger |
| 2016/0090511 | A1 | 3/2016 | Masuda |

* cited by examiner

COATED MEMBRANE COMPOSITE

This application is a National-Stage application of PCT/US2017/038153 filed on Jun. 19, 2017, which claims the benefit of U.S. Provisional Application Ser. No. 62/351,355 filed on Jun. 17, 2016, which are incorporated herein by reference.

FIELD OF THE INVENTION

Embodiments of the present invention are directed toward a membrane composite that includes an olefinic membrane carrying a silicone coating that at least partially encapsulates the membrane.

BACKGROUND OF THE INVENTION

In the building industry, it is useful to cover flat or low-sloped roofs with a polymeric membrane such as an ethylene-propylene-diene rubber (EPDM) membrane. These membranes are advantageous because they offer not only protection from moisture, but the nature of the EPDM provides a degree of resistance to UV light degradation.

EPDM roofing membranes are nonetheless based upon olefinic polymers and are therefore subject to certain shortcomings. For example, these membranes can be deleteriously impacted by a variety of environmental factors that may be encountered in industrial and commercial settings. For example, various greases can gather on a roof top near food preparation. Likewise, in certain industrial settings, various acids and phosphorus-containing compounds can impact a roof surface.

SUMMARY OF THE INVENTION

One or more embodiments of the present invention provide a membrane composite comprising: an olefinic membrane core having first and second planar surfaces; a first silicone coating layer disposed on said first planar surface; and a second silicone coating layer disposed on said second planar surface.

One or more embodiments of the present invention provide a first or second silicone coating layer that is crosslinked.

Yet other embodiments of the present invention provide a roofing system comprising: a first membrane composite including an olefinic membrane core having first and second planar surfaces; a first silicone coating layer disposed on said first planar surface; and a second silicone coating layer disposed on said second planar surface; a second membrane composite including an olefinic membrane core having first and second planar surfaces; a first silicone coating layer disposed on said first planar surface; and a second silicone coating layer disposed on said second planar surface; and a silicone adhesive adhering said first membrane composite to said second membrane composite.

DETAILED DESCRIPTION OF ILLUSTRATIVE EMBODIMENTS

Embodiments of the invention are based, at least in part, on the discovery of an olefinic-based polymer membrane having a silicone coating that at least partially encapsulates the membrane. It is contemplated that the coated membrane will demonstrate advantageous resistance to environmental factors including, but not limited to, ultraviolet light and environmental contaminates such as hydrocarbons in the form of grease, various acids, and chemicals such as phosphorous-containing chemical compounds. Additionally, the silicone coating provides a substrate or interface to which a variety of sealants, tapes, and caulks can be applied, such as silicone adhesive tapes, and thereby provide roofing systems that meet industry specifications and standards.

Membrane Composite Structure

Figure 1:
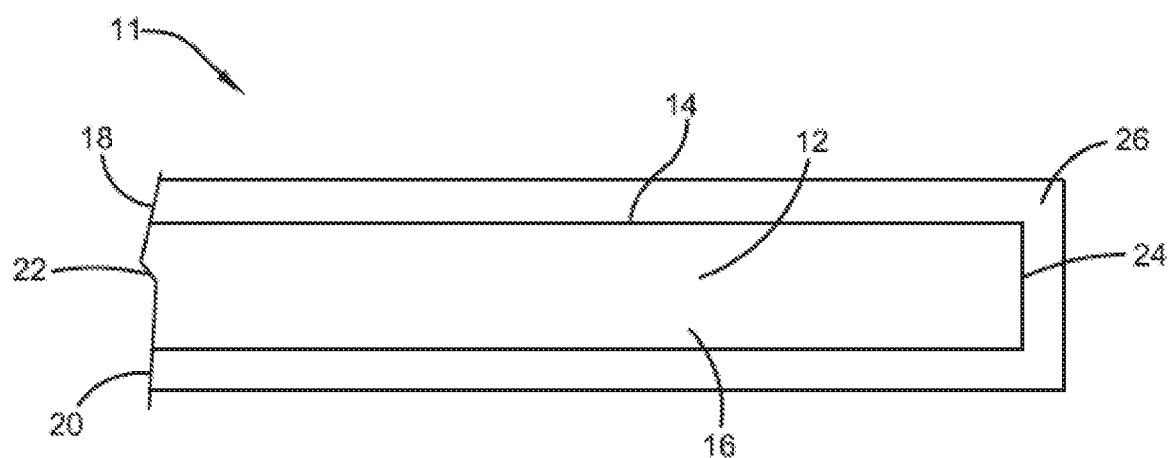
FIG. 1 is a sectional view of a membrane according to embodiments of the present invention.

Embodiments of the invention can be described with reference to FIG. 1, which shows coated membrane 11, which may also be referred to as encapsulated membrane 11 or membrane composite 11. Coated membrane 11 includes an olefinic core 12, which may also be referred to as olefinic membrane 12 or olefinic panel 12. Coated membrane 11 further includes a first silicone coating layer 18 disposed on first planar surface 14 of membrane 12 and a second silicone coating layer 20 disposed on a second planar surface 16 of membrane 12. In one or more embodiments, coating layer 18 and coating layer 20 join to form an optional edge coating 26 at lateral edge 24. In one or more embodiments, both lateral edges 22 and 24 of membrane 12 include (or are encapsulated by) an edge coating formed by the joining or mating of first coating layer 18 and second coating layer 20 at both lateral edges 22, 24. In these or other embodiments, first coating layer 18 and second coating layer 20 do not join or mate at the lateral edges (22, 24) of membrane 12, which thereby provides a structure wherein one or more of the lateral edges (22, 24) of membrane 12 is exposed. For example, as shown in FIG. 1, lateral edge 22 of membrane 12 is exposed.

In one or more embodiments, the thickness of membrane 12 is greater than 500 µm, in other embodiments greater than 750 µm, and in other embodiments greater than 900 µm. In these or other embodiments, the thickness of membrane 12 is less than 3 mm, in other embodiments less than 2 mm, and in other embodiments less than 1.5 mm. In one or more embodiments, the thickness of membrane 12 may be from about 500 µm to about 3 mm, in other embodiments from about 750 µm to about 2 mm, and in other embodiments from about 900 µm to about 1.5 mm.

In one or more embodiments, the thickness of coating layer 18 may be the same or different than the thickness of coating layer 20. In one or more embodiments, the thickness of the coating layers (18, 20) is greater than 5, in other embodiments greater than 10, and in other embodiments greater than 15 µm. In these or other embodiments, the thickness of the coating layers (18, 20) is less than 500, in other embodiments less than 200, and in other embodiments less than 150 µm. In one or more embodiments, the thickness of the coating layers (18, 20) is from about 5 µm to about 500 µm, in other embodiments from about 10 µm to about 200 µm, and in other embodiments from about 15 µm to about 150 µm.

In one or more embodiments, the width of membrane composite 11 is greater than 1 m, in other embodiments greater than 3 m, and in other embodiments greater than 5 m. In these or other embodiments, the width of membrane composite 11 is less than 20 m, in other embodiments less than 18 m, and in other embodiments less than 15 m. In one or more embodiments, the width of membrane composite 11 is from about 1 m to about 20 m, in other embodiments from about 3 m to about 18 m, and in other embodiments from about 5 m to about 15 m.

Membrane Core

As suggested above, membrane 12 is an olefinic membrane. In one or more embodiments, the membrane may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03. Still other membranes may include TPE, PVC, TPV, CSPE, and asphalt-based membranes.

In one or more embodiments, the membranes include cured rubber, one or more fillers, and an extender. These membranes, which may be black or non-black, may include other constituents that are employed in rubber membranes or rubber compounds. For example, the membranes may include oil, wax, antioxidant, antiozonant, flame retardant, and the like. The cured membranes are a cured network deriving from a vulcanizable rubber composition and optionally the residue or reaction product of the cure system. The various other ingredients may be dispersed throughout the cured network. The membrane may further comprise fabric reinforcement.

In one or more embodiments, the cured rubber derives from a crosslinkable rubber. In one or more embodiments, the cured rubber derives from an olefinic rubber such as an olefinic terpolymer. In one or more embodiments, the olefinic terpolymer includes mer units that derive from ethylene, α-olefin, and optionally diene monomer. Useful α-olefins include propylene. In one or more embodiments, the diene monomer may include dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082 as well as U.S. Publication No. 2006/0280892, both of which are incorporated herein by reference. Furthermore, olefinic terpolymers and methods for their manufacture are known as disclosed in U.S. Pat. No. 8,367,760 U.S. Publication No. 2012-0045953, and co-pending U.S. application Ser. No. 12/982,198, which are also incorporated herein by reference. For purposes of this specification, elastomeric terpolymers may simply be referred to as EPDM.

In one or more embodiments, the elastomeric terpolymer may include at least 62 weight percent, and in other embodiments at least 64 weight percent mer units deriving from ethylene; in these or other embodiments, the elastomeric terpolymer may include at most 70 weight percent, and in other embodiments at most 69 weight percent, mer units deriving from ethylene. In one or more embodiments, the elastomeric terpolymer may include at least 2 weight percent, in other embodiments at least 2.4 weight percent, mer units deriving from diene monomer; in these or other embodiments, the elastomeric terpolymer may include at most 4 weight percent, and in other embodiments at most 3.2 weight percent, mer units deriving from diene monomer. In one or more embodiments, the balance of the mer units derive from propylene or other α-olefins. In one or more embodiments, low Mooney EPDM terpolymers are blended with high Mooney EPDM terpolymers to reduce the overall viscosity of the membrane compound and thereby accommodate processing.

As is known in the art, the rubber may be cured with a curative or cure system. The rubber can be cured by using numerous techniques such as those that employ sulfur cure systems, peroxide cure systems, and quinine-type cure systems. In certain embodiments, the sulfur cure systems may be employed in combination with vulcanizing accelerators. Suitable vulcanizing accelerators are disclosed in U.S. Publication No. 2006/0280892, which is incorporated herein by reference. Examples of organic polysulfides are disclosed in U.S. Pat. No. 2,619,481, which is incorporated herein by reference.

Sulfur and sulfur-containing cure systems may be used, and may also be used with an accelerator. Suitable amounts of sulfur can be readily determined by those skilled in the art. In one or more embodiments from about 0.25 to 3.0 parts by weight (pbw) sulfur per 100 parts by weight rubber (phr) may be used, in other embodiments from about 0.30 to 2.8 pbw sulfur phr, and in other embodiments from about 0.35 to 2.5 pbw sulfur phr. The amount of accelerator can also be readily determined by those skilled in the art. In one or more embodiments, from about 1.5 to about 10 pbw accelerator phr may be used, in other embodiments from about 2.0 to about 9 pbw accelerator phr may be used, in other embodiments from about 2.5 to about 8 pbw accelerator phr may be used, and in yet other embodiments from about 3.0 to about 7 pbw accelerator phr may be used.

As mentioned above, the membranes of the present invention may include filler. These fillers may include those conventionally employed in the art, as well as combinations of two or more of these fillers. In one or more embodiments, the filler may include carbon black. Examples of useful carbon blacks include those generally characterized by average industry-wide target values established in ASTM D-1765. Exemplary carbon blacks include GPF (General-Purpose Furnace), FEF (Fast Extrusion Furnace), and SRF (Semi-Reinforcing Furnace). One particular example of a carbon black is N650 GPF Black, which is a petroleum-derived reinforcing carbon black having an average particle size of about 60 nm and a specific gravity of about 1.8 g/cc. Another example is N330, which is a high abrasion furnace black having an average particle size about 30 nm, a maximum ash content of about 0.75%, and a specific gravity of about 1.8 g/cc.

Other useful fillers include clay and talc, such as those disclosed in U.S. Publication No. 2006/0280892, which is incorporated herein by reference. Still other useful fillers include silica, which may be used in conjunction with a coupling agent. U.S. Pat. No. 8,367,760 discloses useful fillers including silica, and is incorporated herein by reference.

As mentioned above, the membranes of the present invention may include extenders. Useful extenders include paraffinic, naphthenic oils, and mixtures thereof. These oils may be halogenated as disclosed in U.S. Pat. No. 6,632,509, which is incorporated herein by reference. In one or more embodiments, useful oils are generally characterized by low surface content, low aromaticity, low volatility and a flash point of more than about 550° F. Useful extenders are commercially available. One particular extender is a paraffinic oil available under the tradename SUNPAR™ 2280 (Sun Oil Company). Another useful paraffinic process oil is HYPRENE P150BS (Ergon Oil Inc. of Jackson, Miss.).

In addition to the foregoing constituents, the membranes of this invention may also optionally include mica, coal filler, ground rubber, titanium dioxide, calcium carbonate, silica, homogenizing agents, phenolic resins, flame retardants, zinc oxide, stearic acid, and mixtures thereof as disclosed in U.S. Publication No. 2006/0280892. Certain embodiments may be substantially devoid of any of these constituents.

In one or more embodiments, the rubber membranes produced by the process of this invention may include from about 20 to about 50, in other embodiments from about 24 to about 36, and in other embodiments from about 28 to about 32% by weight Rubber (e.g., EPDM) based on the entire weight of the mixture.

In one or more embodiments, the rubber membranes produced by the process of this invention may include from about 70 to about 100 pbw, in other embodiments from about 75 to about 95 pbw, and in other embodiments from about 77 to about 85 parts by weight carbon black phr. Certain embodiments may be substantially devoid of carbon black.

In one or more embodiments, the rubber membranes produced by the process of this invention may include from about 55 to about 95 pbw, in other embodiments from about 60 to about 85 pbw, and in other embodiments from about 65 to about 80 pbw extender per 100 pbw phr.

Silicone Coating Layer

As used herein, silicone coating refers to a coating that includes a polymer (or copolymer) or polymeric residue (or copolymer residue) that includes a plurality of —Si—O— units or linkages. In one or more embodiments, these coatings derive from coating compositions that include the polymer or copolymer including the —Si—O— units or linkages. An example of a silicone polymer is a polysiloxane, which may also be referred to as diorganopolysiloxanes or dihydrocarbylpolysiloxanes. Specific examples include polydimethylsiloxane.

Silicone coatings have been described in U.S. Pat. Nos. 4,668,315, 4,681,808, 4,929,703, 4,942,065, 6,416,854, 6,805,914, 7,994,261, 8,747,607, 8,304,505, and U.S. Patent Publication Nos. 2016/0090511, 2009/0022999, 2009/0246539, 2009/0169813, 2011/0015336, 2009/0156755, and Application Publication No. EP1088540A1, all of which are incorporated herein by reference.

Examples of silicone coating compositions that make use of silicone polymers, include, but not limited to, polydimethyl siloxane, polyalkylmethylsiloxane, polydiethylsiloxane, polyfluoropropylmethylsiloxane, polyoctylmethylsiloxane, polytetradecylmethylsiloxane, polyoctadecylmethylsiloxane and polyalkylmethyl, dimethylsiloxane, such as polyhexadecymethylsiloxane-dimethylsioxane. A typical silicone coating composition is POLYCOAT 4000 of Dow Corning Corporation, as is described in U.S. Pat. No. 3,607,972.

In particular embodiments, the silicone coating is a silicone rubber elastomer that derives from a coating composition that includes one or more organic silanes that are dissolved or dispersed in a solvent such as methanol (e.g. Chemlok 607 is available from Lord Corporation. Other useful silicone materials include vinyl tri(methyl-ethyl ketoxime) silicone (commercially available as PRX 306 from Dow Corning Toray Silicone Co., Ltd., Tokyo, Japan). In other embodiments, silicone with a catalyst (commercially available as SE 9500 WV83VB from Dow Corning Toray Silicone Co., Ltd., Tokyo, Japan) may be used. Still other silicone materials that may be used include Silastic Liquid Silicon (SLR) from Dow Corning and Silquest from GE Advanced Materials.

In one or more embodiments, the silicone coating is crosslinked. In one or more embodiments, the coating may be crosslinked by moisture, and in other embodiments, the coating may be crosslinked by an external crosslinking agent. In one or more embodiments, the coating may be crosslinked thermally by hydrosilylation.

Examples of crosslinking agents include, but not limited to, tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyl-triethoxysilane, 3-(glycidyloxy) propyltriethoxysilane, 1,2-bis(tri-methoxysilyl) ethane, 1,2-bis(triethoxysilyl) ethane, methyltris(methylethyl-ketoximo)silane, vinyltris(methylethylketoximo) silane and tetra-kis(methylethylketoximo)silane and partial hydrolyzates of the above-mentioned organosilicon compounds, for example, hexaethoxydisiloxane, and acyloxysilanes, such as vinyltriacetoxysilane, methyltriacetoxysilane or ethyltriacetoxysilane and the partial and mixed hydrolyzates thereof.

In one or more embodiments, the silicone coating may include a filler. The fillers employed can be selected from non-reinforcing fillers or reinforcing fillers. Examples of non-reinforcing fillers include, but are not limited to, quartz, diatomaceous earth, calcium silicate, zirconium silicate, zeolites, metal oxide powders such as aluminum, titanium, iron or zinc oxides or the mixed oxides thereof, barium sulfate, calcium carbonate, gypsum, silicon nitride, silicon carbide, boron nitride, glass and plastic powders such as polyacrylonitrile powders. Examples of reinforcing fillers include, but are not limited to, pyrogenically prepared silica, precipitated silica, precipitated chalk, carbon black such as furnace and acetylene black, and mixed silicon aluminum oxides having a high BET surface area, and fibrous fillers such as asbestos and plastic fibers. The present invention may also include the hydrophobized derivatives of the foregoing fillers. This may be accomplished, for example, by treatment with organosilanes or organosiloxanes or with stearic acid or by etherification of hydroxyl groups to give alkoxy groups.

In one or more embodiments, the silicone coating may include a catalyst. The catalysts may include a metal from the group of the platinum metals or a compound or a complex from the group of the platinum metals. Examples of catalysts employed include, but are not limited to, metallic and finely divided platinum which may be present on supports such as silicon dioxide, aluminium oxide or activated carbon, compounds or complexes of platinum such as platinum halides, platinum-olefin complexes, platinum-phosphite complexes, platinum-alcohol complexes, platinum-alkoxide complexes, platinum-ether complexes, platinum-aldehyde complexes, and cyclohexanone, platinum-vinylsiloxane complexes such as platinum-1,3-divinyl-1,1,3,3-tetramethyldisiloxane complexes with or without a content of detectable inorganically bound halogen, bis (gamma-picoline) platinum dichloride, trimethylenedipyridineplatinum dichloride, dicyclopentadieneplatinum dichloride, dimethylsulfoxide ethyleneplatinum(II) dichloride, cyclooctadieneplatinum dichloride, norbornadieneplatinum dichloride, gamma-picolineplatinum dichloride, cyclopentadieneplatinum dichloride, and also reaction products of platinum tetrachloride with olefin and primary amine or secondary amine or primary and secondary amine, for example the reaction product of platinum tetrachloride dissolved in 1-octene with sec-butylamine, or ammonium-platinum complexes.

In one or more embodiments, primer layer may exist between membrane 12 and one or more silicon coating layers (18, 20, 24). Where reference is made to the coating layers being directly disposed on membrane 12, then it will be understood that a primer layer is not present. Otherwise, it will be understood that a primer layer may exist between the coating layer and the membrane. In particular embodiments, the membranes of the present invention are devoid of a primer layer disposed between the membrane and the coating layers.

Useful primers include those materials that serve to enhance the chemical or physical bond between the membrane and the coating layers. For example, the olefinic-based membrane can be treated with a halo cyclic amide in ethyl acetate, such as Chemlok 7701 commercially available from (Lord Corporation, 111 Lord Drive, Cary, N.C).

Preparation of Coating Layer

In one or more embodiments, the membrane composites of the present invention can be prepared by applying a coating composition to an existing membrane, such as an EPDM membrane. The membranes can be prepared by using conventional techniques. In one or more embodiments, EPDM membranes are prepared by employing an inorganic dusting agent during curing to thereby provide a cured membrane that carries a residue of the dusting agent. In other embodiments, the EPDM membrane is prepared (i.e. cured) in the absence of a dusting agent to thereby provide a membrane that is substantially devoid of inorganic particulate on its surfaces, where substantially devoid refers to less than appreciable amounts of dusting agent.

In other embodiments, the coating composition is applied to an uncured rubber membrane, and then the uncured rubber membrane carrying the coating layer is subjected to curing conditions. In one or more embodiments, the coating composition is applied to an uncured rubber membrane, the coating composition is cured without substantially curing the membrane, and then the membrane is subsequently cured.

In one or more embodiments, application of the curable coating composition to one planar surface of the uncured sheet forms a curable coating layer, which may also be referred to as a layer of curable coating composition. The curable coating layer is then cured, which may take place in conjunction with the curing of the membrane. In one or more embodiments, the silicone material is applied after subjecting the olefinic-based membrane to treatment with a primer.

In one or more embodiments, the thickness of the curable coating layer disposed on one planar surface of the uncured sheet may be at least 0.1 µm, in other embodiments at least 0.3 µm, and in other embodiments at least 0.5 µm. In these or other embodiments, the thickness of the curable coating layer may be at most 10 µm, in other embodiments at most 7 µm, and in other embodiments at most 5 µm. In one or more embodiments, the thickness of the curable coating layer may be from about 0.1 to about 10 µm, in other embodiments from about 0.3 to about 7 µm, and in other embodiments from about 0.5 to about 5 µm.

The curable coating composition may be applied to one planar surface of the cured or uncured sheet using a variety of techniques. In one or more embodiments, the silicon-containing coating can be applied to the membrane by using various techniques including, but not limited to, spraying, brush coating or roller painting. In one or more embodiments, the curable coating composition is applied to a planar surface of the uncured sheet using spraying techniques. In other embodiments, the curable coating composition is disposed on the planar surface of an uncured sheet using knife-coating techniques. In other embodiments, a curtain coater may be employed. In yet other embodiments, coating rods may be employed.

In one or more embodiments, the curable coating composition is applied over substantially the entire planar surface of the cured or uncured sheet. In these or other embodiments, the uncured coating layer formed by application of the coating composition to the uncured sheet is continuous. In one or more embodiments, the curable coating layer covers at least 80%, in other embodiments at least 85%, in other embodiments at least 90%, and in other embodiments at least 99% of the surface area of one planar surface of the uncured sheet.

In one or more embodiments, the curable coating composition is applied to the membrane in a manner to thereby produce a composite that may only include one layer of silicone coating on one planar surface of the membrane.

In particular embodiments, the curable coating composition is not applied to specific areas of the planar surface of the uncured sheet. For example, the planar surface of the uncured sheet may include a region, generally known as the lap region, which is the area wherein the final product will overlap with adjoining sheets in a roof construction. These lap regions generally extend along the length of the membrane adjacent to the lateral edge of the membrane; i.e., the edge running along the length of the membrane. In one or more embodiments, the membrane may include one lap edge, and in other embodiments the membrane may include two lap edges, one on each opposing lateral side of the membrane.

In one or more embodiments, the step of applying the curable coating composition to one planar surface of the membrane excludes application of the curable coating composition to one or more lap regions. In these or other embodiments, the layer of curable coating composition may nonetheless be continuous between the lap regions.

In one or more embodiments, the curable coating composition is a composition that is curable by electromagnetic radiation. In these or other embodiments, the composition is curable without the addition of a curing or crosslinking agent; i.e., the composition is curable in the absence of a curing compound that incorporates itself into the cured matrix. The curable coating composition may nonetheless include one or more cure promoters. In particular embodiments, the curable coating composition is curable by UV light.

In one or more embodiments, the curable coating composition includes monomer and/or oligomer that are cross-linked and/or further polymerized upon exposure to electromagnetic radiation (e.g., UV light).

In one more embodiments, the curable coating composition yields, upon curing, a cured polymeric network that includes polar groups. These polar groups may include, for example, ester functionalities, carboxylic acid functionalities, urethane functionalities, or alkoxysilane functionalities. As a result, the cured coating exhibits polar characteristics, which may advantageously inhibit adhesion to non-polar surfaces, such as the planar surface of a rubber sheet.

In one or more embodiments, the curable coating composition yields, upon curing, a cured polymeric composition or coating layer that exhibits flexibility; i.e., the cured coating layer can undergo flex stresses, such as those that would be experienced during the rolling of a membrane, without cracking. In these or other embodiments, the curable coating composition yields cured coatings that are elastic; i.e., the cured coating composition can be stretched to a 200% elongation without rupture.

In one or more embodiments, the curable coating composition is a 100% solids composition (i.e., the composition is devoid or substantially devoid of solvent). In these or other embodiments, the curable coating composition is a liquid composition that is devoid or substantially devoid of solvent.

In one or more embodiments, the curable coating composition includes a UV-curable silicone coating. In one or more embodiments, the curable coating composition may include a cure promoter. Suitable ionizing crosslinking promoters that can be used include: liquid high-vinyl 1,2-polybutadiene resins containing 90 percent 1,2-vinyl content; Sartomer SR-206 (ethylene glycol dimethacrylate), Di-Cup R(dicumyl peroxide, about 98 percent active), and Pental A (pentaerythritol resin prepared from tall oil). These chemical additives are preferably compatible with the other ingredients in the composition and may also function to reduce the dosage of ionizing radiation needed to obtain the desired level of crosslinking.

Curing Curable Coating

Once a coating layer is formed on the membrane (either cured or uncured membrane), the coating layer may be cured. This may be accomplished by subjecting the coating composition to energy that causes the coating composition to cure. As suggested above, curing of the coating composition may include polymerization of monomer or oligomer within the coating composition. In these or other embodiments, curing of the coating composition may include crosslinking of the coating composition. In one or more embodiments, the coating composition is cured upon the formation of a three dimensional polymeric network. In these or other embodiments, curing of the coating composition is indicated by an appreciable change in the solubility of the coating composition; in other words, while the coating composition may be soluble within particular solvents in its uncured state, the cured coating composition is substantially insoluble within the same solvent.

In one or more embodiments, the step of curing the curable coating composition may form chemical bonds between the coating composition and the cured or uncured rubber sheet.

The step of applying energy to the coating composition may be accomplished using a variety of techniques. For example, the curable coating composition can be subjected to electromagnetic radiation such as UV radiation or IR radiation. In other embodiments, the coating may be subjected to heat. In yet other embodiments, the coating may be cured at ambient conditions.

In one or more embodiments, the step of curing substantially cures the curable coating, which refers to the fact that further curing of the curable coating after the step of curing will not be appreciable within the context of this invention. For example, further curing of the curable coating will not have a deleterious impact on the subsequent steps of the process. In one or more embodiments, the step of curing the curable coating cures the curable coating to at least 70%, in other embodiments at least 80%, in other embodiments at least 90%, in other embodiments at least 95%, and in other embodiments at least 99% of its curing potential. Stated another, if subjected to further curing conditions, such as additional forms or degrees of energy, the curable coating composition will further cure by at most 30%, in other embodiments at most 20%, in other embodiments by at most 10%, in other embodiments by at most 5%, and in other embodiments by at most 1%.

In one or more embodiments, the step of curing produces a cured coating that is generally characterized by very little tack. In these or other embodiments, the cured coating likewise provides relatively low adhesion, especially to uncured rubber (e.g. EPDM). Likewise the cured coating of these or other embodiments does not form a strong bond to uncured rubber after being mated to uncured rubber while the rubber undergoes curing. In one or more embodiments, where the cured coating is mated to green EPDM, and the green EPDM is subjected to curing conditions while mated to the cured coating, the bond between the cured coating and the cured EPDM is characterized by a peel adhesion (ASTM D412) of less than 8, in other embodiments less than 5, in other embodiments less than 3, in other embodiments less than 2, and in other embodiments less than 1 lbf/in. In view of this, after the coating composition is cured, the uncured membrane may be rolled and then cured while in the form of a roll.

Following preparation of the membrane composite, which includes curing of the membrane and the coating (either separately or together) the membrane composite may undergo further fabrication, such as trimming or sizing, and is then rolled and transported to a job site.

INDUSTRIAL APPLICABILITY

The membrane composites according to the present invention can be used as a roofing membrane to cover flat or low-sloped roofs. The membranes can be attached to the roof surface by using various techniques. In one embodiment, ballast is used. In another embodiment, the membrane is mechanically attached to the roof surface. In another embodiment, a fully-adhered roofing system can be created by the use of a bond adhesive applied during installation. In yet other embodiments, the membrane can carry a fabric backing, such as a fleece backing, and the membrane can be adhered to the roof surface using various adhesives that bind to the fabric backing. In yet other embodiments, the membrane can be fabricated to include a factory-applied adhesive layer, which is a pressure-sensitive adhesive. This membrane assembly typically includes a release paper that is removed at the time of installation and the membrane is adhered, through the pressure-sensitive adhesive, to the roof surface.

A roof system according to embodiments of the present invention can be described with reference to FIG. 2, which shows roof system 25 including first membrane composite 11 and second membrane composite 11'. First membrane composite 11 is a membrane in accordance with the present invention and therefore includes a membrane core 12 carrying first and second silicone coating layers 18, 20. Likewise, membrane composite 11' is a membrane composite in accordance with the present invention and therefore includes membrane core 12' carrying first and second silicone coating layers 18', 20'. First membrane composite 11 and second membrane composite 11' are adhered to one another along respective edges thereof (i.e. they are seamed) through a silicone adhesive 32. In one or more embodiments, adhesive 32 is a silicone adhesive tape. In other embodiments, adhesive layer 32 is a residue or cured form of a silicone liquid adhesive.

Figure 2:
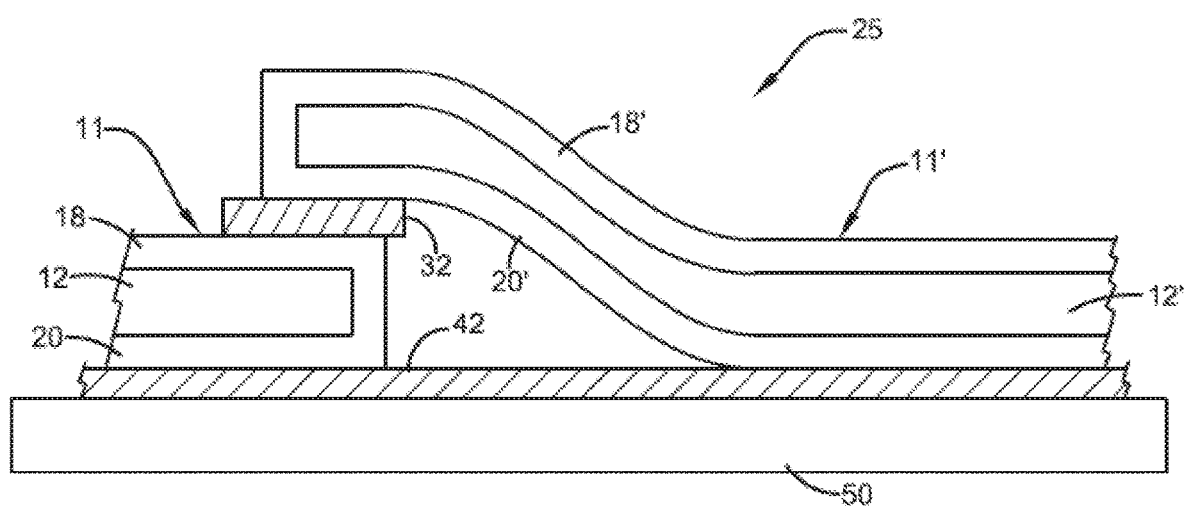
FIG. 2 is a sectional view of a roof system according to embodiments of the present invention.

As also shown in FIG. 2, first membrane composite 11 and second membrane composite 11' may be adhered to the roof substrate 50 through adhesive layer 42. In one or more embodiments, adhesive layer 42 is the residue or cured form of a silicone liquid adhesive. In other embodiments, adhesive layer 42 is a silicone solids adhesive including, but not limited to, an adhesive that is formed by the application of a melt-extrudable, pressure-sensitive adhesive to the membrane composite. In one or more embodiments, the adhesive may be a one-component, acid-curing silicone sealant such as that available under the tradename ELASTOSIL 4000 (Wacker). Other useful sealants are available under the tradenames 756 SMS Building Sealant, 758 Silicone Weather Barrier Sealant, and 999A Sealant (Dow Corning), which may be used in conjunction with a Silicone Transition Strip (Dow Corning).

For purposes of this specification, the material to which the adhesive secures the membrane, which is the uppermost layer, can be referred to as the substrate. For example, where the membrane is adhesively secured to an insulation board or layer, the insulation board or layer may be referred to as a substrate. Accordingly, the substrate to which the membrane composites of this invention may be attached include, but are not limited to, roof decks, insulation boards, coverboards, and existing membranes.

Practice of this invention is not limited by the selection of any particular roof deck. Accordingly, the roofing systems herein can include a variety of roof decks. Exemplary roof decks include concrete pads, steel decks, wood beams, and foamed concrete decks.

In one or more embodiments, the substrate may include existing membranes, which may include cured rubber systems such as EPDM membranes, functionalized polyolefin copolymers systems such as TPO membranes, or asphalt-based systems such as modified asphalt membranes and/or built roof systems.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which is incorporated herein by reference. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood.

In one or more embodiments, cover boards may include high density polyurethane or polyisocyanurate board as disclosed in U.S. Publication Nos. 2006/0127664, 2013/0164524, 2014/0011008, 2013/0036694, and 2012/0167510, which are incorporated herein by reference. In other embodiments, the cover boards may include construction boards such as DensDeck.

In other embodiments, these membranes may be employed to cover flat or low-slope roofs following a re-roofing event. In one or more embodiments, the membranes may be employed for re-roofing as described in U.S. Publication No. 2006/0179749, which is incorporated herein by reference.

Practice of the present invention is also not necessarily limited by the adhesive employed to bond the membrane to the substrate. For example, the adhesive may include an adhesive that forms a bond through curing action such as is the case with a liquid bond adhesive (e.g. a butyl rubber adhesive) or a polyurethane adhesive. In other embodiments, the adhesive may be a pressure-sensitive adhesive, which may be applied to the membrane at the location where the membrane is manufactured (e.g. a factory-applied pressure-sensitive adhesive). In particular embodiments, the adhesive is a silicone adhesive such as, but not limited to, a polysiloxane (e.g. polydimethylsiloxane) adhesive.

As used within the specification, the term "fully-adhered roofing system" refers to a roofing system wherein the primary mode of attachment of the membrane to the underlying substrate is through the use of an adhesive. In one or more embodiments, this mode of attachment includes the situation where at least 50%, in other embodiments at least 70%, in other embodiments at least 90%, and in other embodiments at least 98% of the underlying surface of the membrane (i.e., the substrate-contacting planar surface of the membrane) is adhered to the substrate through an adhesive.

Various modifications and alterations that do not depart from the scope and spirit of this invention will become apparent to those skilled in the art. This invention is not to be duly limited to the illustrative embodiments set forth herein.

What is claimed is:

1. A roofing membrane composite comprising:
   (i) an olefinic membrane core having first and second planar surfaces;
   (ii) a first silicone coating layer disposed on said first planar surface; and
   (iii) a second silicone coating layer disposed on said second planar surface, where the roofing membrane is adapted for installation on a roof surface as the roof covering;
   (iv) a silicone adhesive disposed on said first or second silicone coating layer.

2. The roofing membrane composite of claim 1, wherein the first or second silicone coating layer is crosslinked.

3. The roofing membrane composite of claim 1, where the olefinic membrane is an EPDM membrane.

4. The roofing membrane composite of claim 3, where the thickness of the EPDM membrane is from about 500 μm to about 3 mm, and where width of the EPDM membrane is from about 1 to about 20 m.

5. The roofing membrane composite of claim 4, where the first and second silicone coating layers have a thickness of from about 5 to about 500 μm, and where width of the EPDM membrane is from about 3 to about 18 m.

6. The roofing membrane composite of claim 1, where said first and second silicone coating layers mate at least one lateral edge of said membrane.

7. The roofing membrane composite of claim 1, where said silicone coating layer is a dried or cured layer of a silicon polymer.

8. The roofing membrane composite of claim 7, where said silicone polymer is a polysiloxane.

9. The roofing membrane composite of claim 8, where said polysiloxane is a diorganopolysiloxane or a dihydrocarbylpolysiloxane.

10. The roofing membrane composite of claim 1, where a primer layer is disposed between said membrane and said silicone coating layer.

11. A roofing system comprising:
    (i) a first membrane composite including an olefinic membrane core having first and second planar surfaces; a first silicone coating layer disposed on said first planar surface; and a second silicone coating layer disposed on said second planar surface;

(ii) a second membrane composite including an olefinic membrane core having first and second planar surfaces; a first silicone coating layer disposed on said first planar surface; and a second silicone coating layer disposed on said second planar surface; and (iii) a silicone adhesive adhering said first membrane composite to said second membrane composite.

12. The roof system of claim 11, the roof system including a substrate to which said first and second membrane composites are affixed.

13. The roof system of claim 12, where said membrane composites are affixed to said substrate through silicone adhesive.

14. The roof system of claim 11, where said substrate includes at least one of a roof deck, an insulation board, a coverboard, or an existing membrane.

15. The roof system of claim 11, where said olefinic membrane of said first composite and said olefinic membrane of said second composite are EPDM membranes.

16. A roofing system comprising:
(i) a roof deck;
(ii) a first and second membrane composite disposed above the roof deck and secured thereto, where each membrane composite includes an olefinic membrane core having first and second planar surfaces, a first silicone coating layer disposed on said first planar surface, and a second silicone coating layer disposed on said second planar surface, where the a first and second membrane composite are attached by a silicone adhesive to each other to thereby form a seam.

17. The roofing system of claim 16, where an insulation board is disposed between said roof deck and said at least two membrane composites.

18. The roofing system of claim 16, where the olefinic membrane core of said first and second membrane is an EPDM membrane, having a thickness from about 500 μm to about 3 mm, and where the first and second silicone coating layers of said first and second membrane have a thickness of from about 5 to about 500 μm.

* * * * *

UNITED STATES PATENT AND TRADEMARK OFFICE
CERTIFICATE OF CORRECTION

PATENT NO. : 10,843,442 B2
APPLICATION NO. : 16/309125
DATED : November 24, 2020
INVENTOR(S) : Wang et al.

Page 1 of 1

It is certified that error appears in the above-identified patent and that said Letters Patent is hereby corrected as shown below:

In the Claims

In Column 12, Line 53, delete "silicon" and insert -- silicone --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*